United States Patent [19]

Hwang et al.

[11] Patent Number: 4,915,169

[45] Date of Patent: Apr. 10, 1990

[54] METHOD FOR CONTROLLING THE PH OF STEAM FLUIDS USING HETEROCYCLIC, MULTIFUNCTIONAL, NITROGEN-CONTAINING COMPOUNDS

[75] Inventors: Rong J. Hwang, Hacienda Heights; Andrew Nigrini, La Habra Heights; Marion G. Reed, Hacienda Heights, all of Calif.

[73] Assignee: Chevron Research Company, San Francisco, Calif.

[21] Appl. No.: 297,229

[22] Filed: Jan. 13, 1989

[51] Int. Cl.$^4$ ............... E21B 43/24; E21B 47/00; E21B 43/22

[52] U.S. Cl. .................. 166/252; 166/303; 166/902; 166/305.1; 122/459

[58] Field of Search ............ 166/250, 252, 272, 303, 166/294, 305.1, 307, 902; 60/641.2; 122/459; 210/696, 697, 699; 405/264

[56] References Cited

U.S. PATENT DOCUMENTS

| | | | |
|---|---|---|---|
| 4,227,575 | 10/1980 | Nooner | 166/303 |
| 4,475,595 | 10/1984 | Watkins et al. | 166/303 |
| 4,549,609 | 10/1985 | Watkins et al. | 166/272 X |
| 4,572,296 | 2/1986 | Watkins | 166/303 |
| 4,714,112 | 12/1987 | Nigrini et al. | 166/303 X |
| 4,802,533 | 2/1989 | Hsueh et al. | 166/272 X |

OTHER PUBLICATIONS

Reed, M. G., "Gravel Pack and Formation Sandstone Dissolution During Steam Injection", *Journal of Petroleum Technology,* vol. 32, Jun. 1980, pp. 941–949.

*Primary Examiner*—George A. Suchfield
*Attorney, Agent, or Firm*—Edward J. Keeling

[57] ABSTRACT

The present invention relates to an improved method for controlling pH in the liquid and vapor phases of wet steam having such phases formed in a steam generation system from feedwater having therein at least one carbonate species which in the presence of steam forms a vapor phase component tending to lower the pH of the vapor phase of the steam upon condensation and a liquid phase component tending to raise the pH of the liquid phase of the steam. It comprises: (a) converting the feedwater in a steam generation system to steam having a vapor phase and a liquid phase; and (b) adding to the steam generation system, a heterocyclic, multifunctional, nitrogen-containing compound capable of forming a nonvolatile anionic component and a cationic component that, in the presence of said system, yields hydrogen ions for reducing the pH of the liquid phase of said steam and an alkaline component for increasing the pH of the vapor phase of said steam upon condensation.

18 Claims, No Drawings

METHOD FOR CONTROLLING THE PH OF STEAM FLUIDS USING HETEROCYCLIC, MULTIFUNCTIONAL, NITROGEN-CONTAINING COMPOUNDS

BACKGROUND OF THE INVENTION

The present invention relates to a method for controlling the pH of steam fluids. More particularly, the invention relates to a method for (1) preserving the reservoir rock and/or gravel packing in oil wells being subjected to steam enhanced oil recovery techniques; (2) preventing permeability damage to hydrocarbon-bearing formations which contain clay minerals; (3) controlling corrosion produced by an acidic vapor phase condensate of the steam; and (4) improving the steam injection rate into the formation.

Steam injection techniques such as steam stimulation and steamflooding, have been used to recover immobile heavy oils and to enhance the oil recovery from older wells where the natural field pressures are too low for unassisted production. They are designed to reduce the reservoir flow resistance by reducing the viscosity of the crude.

These techniques involve injection into the well of a high temperature wet steam in cycles of thousands of cubic meters at a time. Wet steam is a mixture of steam and varying amount of hot liquid water, the quality of wet steam generally ranging from 35% to 80%. Because of the density difference between the two phases of the wet steam, the vapor phase preferentially enters the upper part of the injection interval and the liquid phase preferentially enters the lower part.

When groundwater, river water, or lake water is used as feedwater to generate wet steam, the liquid water phase is generally basic (having a pH in excess of 11) and the vapor phase of the wet steam, when condensed, is acidic (having a pH of about 4.0 to 4.5). This partitioning is because of bicarbonate contained in the source water decomposing to $CO_2$ and $OH^-$, as shown in Equation 1 below:

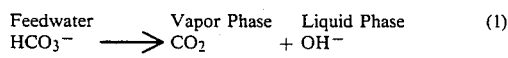

The $CO_2$ is volatile and enters the vapor phase, which produces a low pH in the liquids condensed from the vapor phase. The $OH^-$ ion enters the liquid phase and causes a high pH in the liquid phase.

Associated with using these wet steams in steam injection is the problem of silica and silicate dissolution. Coupled with high fluid temperatures, both the liquid phase and the liquids from the condensed vapor phase are capable of rapidly dissolving reservoir rocks, such as sandstone, carbonate, diatomite, procellanite and the like. For pH values above 11.0 and temperatures above 177° C., the silica and silicate dissolution rates are orders of magnitude higher than at neutral/ambient conditions. Also, because the reactions for dissolving siliceous reservoir rocks are base consumers in alkaline fluids, the pH of the residual fluid decreases rapidly as the fluid moves away from the wellbore, causing the dissolution reactions and solubility to diminish raidly and causing the reaction products downstream (such as alumino-silicates and other metal silicates) to precipitate in the pores. This precipitation decreases the formation permeability and decreases well injectivity.

Dissolution of the gravel pack has been shown to be primarily a function of the pH and temperature of the injected liquid-phase water. Prior attempts at solution of the problem have focused on these aspects. For example, by keeping the pH of the injected hot water below 10, gravel pack dissolution can be decreased sharply. This may be accomplished by treating the feed water with acid to yield the desired effluent pH.

Using acid to neutralize the bicarbonate alkalinity, was suggested by M. G. Reed in "Gravel Pack and Formation Sandstone Dissolution During Steam Injection", Journal of Petroleum Technology, Vol. 32, pp. 941-949 (1980). But this approach suffers from considerations of costs as well as feasibility of the method. That is, addition of too much acid will cause severe corrosion of the steam generator and too little will result in insufficient depression of the pH to alleviate silica loss.

U.S. Pat. No. 4,475,595 to Watkins et al, filed Aug. 23, 1982, which is hereby incorporated by reference, addresses the problem of silica dissolution during steam injection. Watkins et al discuss adding an ammonium salt to the generator feedwater or to the steam itself. The resulting ammonia gas generated from decomposition of the ammonium salt partitions to the vapor phase leaving an acidic component to neutralize the $OH^-$ ions in the residual liquid phase.

Another problem associated with Equation (1) is its effect on the vapor phase of the steam. The carbon dioxide partitions into the vapor phase while the hydroxyl ions remain in the liquid phase. The vapor phase of the wet steam, when condensed, may have an acidic pH of about 4.0 to 4.5 resulting from the carbon dioxide combining with water to form carbonic acid, a known corrosive. Carbonic acid causes corrosion of steel conduit with which it comes in contact and combines with alkaline earth ions to form scale which adheres to the surfaces of the pores in the reservoir, the well bore and other conduits and builds up in thickness over a period of time.

U.S. Pat. No. 4,476,930 to Watanabe, filed Aug. 23, 1982, which is hereby incorporated by reference, addresses the problem of scale inhibition during steam generation. Watanabe discusses adding an ammonium salt to the steam generator feedwater. Ammonia gas partitions to the vapor phase and inhibits the production of carbonic acid.

U.S. Ser. No. 164,924 to Nigrini et al, entitled "Method for Controlling the pH of Steam Fluids", field March 7, 1988, now U.S. Pat. No. 4,871,023 also addresses the problem of silica dissolution during steam injection. Nigrini et al discuss adding phosphorus, arsenic, antimony and bismuth-containing compounds to the steam which alter its pH.

Also associated with injecting wet steam is the problem of permeability damage of formations containing clay. Formations that contain clay minerals are susceptible to water-rock interactions that cause the clay to disperse and migrate. When they move downstream, they tend to bridge in pore constrictions to form miniature filter-cakes throughout the pore network. This can decrease steam injectivity in the lower interval where liquid water is injected and also in the upper interval where vapor phase condensation takes place. In some cases, clay structural expansion may contribute to this decrease in permeability.

U.S. Pat. No. 4,549,609 to Watkins et al, which is hereby incorporated by reference, addresses the problem of permeability damage of formations containing clay. Watkins et al injection a steam containing an ammonical nitrogen-containing compound. Ammonia is effective for clay stabilization.

U.S. Pat. No. 4,714,112, to Hsueh et al, entitled "Method for Inhibiting Silica Dissolution and Pipe Corrosion During Oil Well Steam Injection", filed June 22, 1987, discusses reducing silica dissolution and preventing permeability damage using ammonia-containing compounds.

While some well-treating methods have met with some success, the need exists for an improved method which inhibits silica dissolution and prevents permeability damage of formations containing clay minerals. Accordingly, it is the principal object of this invention to provide such methods.

SUMMARY OF THE INVENTION

The present invention relates to an improved method for controlling pH in the liquid and condensed vapor phases of wet steam having such phases formed in a steam generation system from feedwater having therein at least one carbonate species which in the presence of steam forms a vapor phase component tending to lower the pH of the vapor phase component tending to lower the pH of the vapor phase of the steam upon condensation and a liquid phase component tending to raise the pH of the liquid phase of the steam. It comprises: (a) converting the feedwater in a steam generation system to steam having a vapor phase and a liquid phase; and (b) adding to the steam generation system, a heterocyclic, multifunctional, nitrogen-containing compound capable of forming a nonvolatile anionic component and a cationic component that, in the presence of said steam, yields hydrogen ions for reducing the pH of the liquid phase of said steam and an alkaline component for increasing the pH of the vapor phase of said steam upon condensation.

In an alternative embodiment, the invention inhibits permeability damage of a formation containing clay minerals in the vicinity of a well penetrating the formation. It comprises injecting a wet steam which has an amount of a heterocyclic, multifunctional, nitrogen-containing compound in the vapor phase of the wet steam effective to inhibit permeability damage to the formation in the vicinity of the vapor phase.

DETAILED DESCRIPTION OF THE PREFERRED EMBODIMENTS

In its broadest aspects, the invention inhibits silica dissolution and prevents permeability damage in formations containing clay minerals. Specifically, it: (1) controls the pH in the condensed vapor and liquid phases of wet steam; and (2) stabilizes clay in the vapor phase condensation region.

pH Control in Liquid and Vapor Phases

In steam fluids, pH control is a function of the steam generator feedwater and its bicarbonate concentration. For example, the decomposition of the bicarbonate ion upon heating is according to the formula:

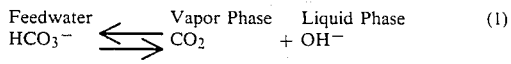

This causes the pH of the vapor phase of the steam (upon condensation) to drop and the pH of the residual liquid phase to increase. During steam injection, the vapor phase of the steam typically enters the upper part of the production interval while the alkaline liquid residual fluid phase enters the lower part of the production interval. But, regardless of where the vapor or liquid phases of the steam enter the production interval, the pH partitioning causes gravel pack and formation rock dissolution and increases overall maintenance costs and time.

This problem was addressed in U.S. Ser. No. 048,869, to Nigrini, entitled "Method of Controlling Rock Dissolution During Oil Well Steam Injection", filed May 4, 1987, now abandoned. There the problem was addressed through the addition of ammonium salts. That application taught that the ammonium cation decomposes, allowing NH$_3$ to move into the vapor phase and increase the pH of the condensed vapor. Simultaneously, the H$^+$ ion remained in the liquid phase to reduce its pH.

Similarly, U.S. Ser. No. 164,924, to Nigrini et al entitled "Method for Controlling the pH of Steam Fluids", filed March 7, 1988, discusses the problem of silica dissolution. Specifically, Nigrini et al teach that certain compounds selected from the group of phophorus, arsenic, antimony, and bismuth containing compounds have the property of reducing the pH of the liquid phase of wet steam and increasing the pH of the vapor phase of wet steam upon condensation.

We have now discovered an entirely new family of compounds which have similar functions. Specifically, we have have discovered that certain heterocyclic, multifunctional, nitrogen-containing compounds have the property of yielding hydrogen ions for reducing the pH of the liquid phase of the wet steam and an alkaline component for increasing the pH of the vapor phase of wet steam upon condensation. The selection of specific compounds depends upon the volatility and basicity of the cation compounds. See Hamer et al, Industrial Waste Water Treatment (1962), for a discussion of the volatility of certain ammonia-containing compounds.

Surprisingly, this new set of compounds also prevents permeability damage of hydrocarbon-bearing formations which contain clay minerals.

Suitable compounds include the acid salts of morpholine and imidazole and substituted compounds thereof. Morpholine hydrochloride and imidazole hydrochloride are typical examples. For morpholine hydrochloride, the morpholinium cation decomposes and a species thereof, i.e., morpholine moves into the vapor phase according to the formula:

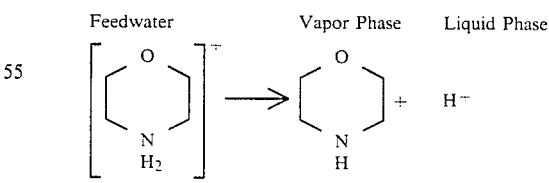

The alkaline component increases the pH of the vapor phase of the steam upon condensation and the H$^+$ neutralizes the OH$^-$ in the liquid phase and reduces its alkaline pH. The amount of compound required depends on the total bicarbonate ion concentration in the steam generator feed water. This concentration can be determined by standard bicarbonate titration methods, such as CO$_2$ coulometric methods. Thereafter, the desired amount of the salt is added to the feed water entering the steam generator.

Because the titration method is difficult to perform in the field, once the bicarbonate concentration is determined, the amount of compound to be added is adjusted by monitoring the pH of the residual liquid phase of the steam. If the pH is too high, then more compound is added. If the pH is too low, then less compound is added. The pH should be adjusted through the addition of the compound to from about pH 8.0 to about pH 10.0 and preferably from about pH 8.5 to about pH 9.5 for both the residual liquid phase and the condensed vapor phase.

Alternatively, the pH control problem can be remedied by adding a compound which decomposes in the steam generation system to form an acid neutralizer or buffer having alkaline pH values. Preferably these compounds are amides of carbamic acid and their derivatives, amides of thiocarbamic acids and their derivatives, tertiary carboxylic acid amides and their substituted and alkylated derivatives, and mixtures thereof. Urea is a particularly effective buffer. Of course adding a buffer can be combined with pH monitoring to be a very effective way of keeping the pH of the liquid phase between 8.5 and 9.5.

Another problem associated with heating a bicarbonate-containing feedwater as shown by Equation (1), is the partitioning of $CO_2$ into the vapor phase of the wet steam. When the vapor phase is condensed, the $CO_2$ forms carbonic acid and may result in a vapor phase condensate having a pH in the 4.0 to 4.5 range. This problem is also remedied by the present invention. The alkaline component in the vapor phase of the wet steam raises the pH of the condensed vapor phase and effectively inhibits corrosion.

In an alternative embodiment, the problem of silica dissolution is addressed by adding an acid to the steam generation system directly to titrate the hydroxide ions produced by Equation (1). Simultaneously, a compound which forms an alkaline component for increasing the pH of the vapor phase of the steam upon condensation is added to the wet steam to control corrosion resulting from the vapor phase condensate. Any acid which forms an acidic component in the residual liquid phase of the wet steam when heated is suitable for this purpose. Useful acids include the halogen acids, sulfuric acid, phosphoric acid, acetic acid, nitric acid, and mixtures thereof. The amount of acid required initially depends on the total carbonate ion concentration in the steam generator feedwater. In general, the amount of acid added is the stoichiometric amount of bicarbonate present in the feedwater. The desired initial amount of acid is added to reduce the pH of the residual liquid phase of the wet steam to within the range of from 8.0 to 10.0, preferably within the range of from 8.5 to 9.5.

Suitable heterocyclic, multifunctional, nitrogen-containing compounds are those selected from the group consisting of morpholines, substituted morpholines, imidazoles and substituted imidazoles.

To control the problem of corrosion resulting from acid overtreatment, the pH of the residual liquid phase may be continuously monitored and the addition of acid continuously adjusted. Preferably, the pH of the residual liquid phase is maintained between 8.0 and 10.0, preferably between 8.5 and 9.5. Alternatively, a buffer or acid neutralizer such as urea can be used alone or in conjunction with pH monitor to control acid overtreatment.

Clay Stabilization in Vapor Phase Condensation Region

Heterocyclic, multifunctional, mitrogen-containing compounds are also highly effective for clay stabilization in the vapor phase condensation region. Suitable compounds are those selected from the group of morpholines, imidazoles, and their substituted forms. For example, morpholinium ions are extraordinarily effective in stabilizing clays to prevent formation permeability damage. This is so because they are adsorbed very tenaciously on clay mineral surfaces and thus they are essentially non-exchangeable to most cations normally contacting the formation. Since they carry a positive charge and they are essentially non-exchangeable, the adsorption of morpholinium ions effectively eliminates the negative charge on the clays and causes them to lose their ability to expand and disperse. Expansion and dispersion are the principal clay properties that cause clay related permeability damage, therefore application of morpholinium ions is a very effective clay stabilizing treatment. Because of the relatively high vapor pressure of morpholine it is carried to the vapor condensate region where it forms morpholinium ions and adsorb on the formation surfaces.

When morpholine hydrochloride passes through the generator, it decomposes to morpholine and acid. The morpholine is an alkaline gas that partitions to the vapor phase, the acid partitions to the liquid phase. Equation (2) demonstrates this reaction:

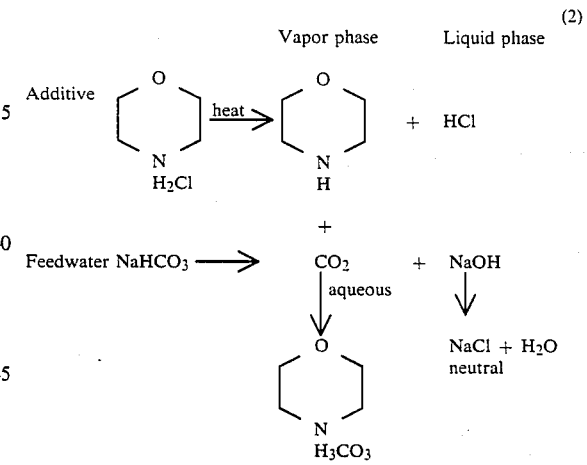

The morpholinium ions at the point of vapor phase condensation help prevent permeability damage and maintain near neutral pH's on both the vapor phase condensation region and the liquid phase injection region.

In the present invention, a sufficient amount of a source of morpholinium ions are added to the wet steam or feedwater to produce a morpholinium ion concentration in the vapor phase condensate of the wet steam effective to inhibit permeability damage of clay mineral-containing formations in the vicinity of the vapor phase of the injected wet steam and to improve the injectivity of the wet steam into the formation at the same location. Preferably, the morpholinium ion concentration in the vapor phase condensate of the wet steam is less than 2 N, more preferably, from 0.01 N to 0.5 N.

To determine the desired amount of morpholine to be used in a given application, the preferred method is to take core samples from the formation in question and determine the mass of rock effectively treated per mole of chemical. From this information and the porosity, the total amount of chemical needed to effectively treat a given formation to some desired radius from the wellbore can be calculated.

The amount of rock effectively treated per mole of chemical is determined by injecting enough morpholinium salt solution into the core plug to only partially treat the plug. This amount of chemical needed to partically treat the plug is estimated from cation exchange capacity data or is determined by trial and error. Since the morpholininium ions are chromatographically absorbed by the rock surfaces, the ions will pass through the effectively covered areas and then attach to the first available site. Thus, in a partially treated core plug, the influent end will be effectively treated and the effluent end will still be susceptible to permeability damage. The untreated portion of the core plug is then sensitized to permeability damage by flowing a 1N sodium chloride solution followed by deionized water.

This work is done in a flow cell having pressure taps distributed along the core plug such that the permeability of the plug can be measured as a function of the distance along the plug. The permeability profile is measured while flowing 1N sodium chloride before the morpholine treatment and while flowing deionized water after the above-described procedure is carried out. The effectively treated rock is that portion of the core plug that retained essentially all of its permeabilty. Knowing this mass and the amount of chemical used, one can calculate the number of moles of chemical needed to effectively treat a unit mass of the rock in question. Hereafter, this number is called the treatment efficiency factor.

The total amount of chemical needed is determined by multiplying the previously determined treatment efficiency factor times the mass of rock to be treated. The rock mass to be treated is calculated from the desired treatment radius, porosity, and the thickness of the injection interval.

EXAMPLE

This example well produces oil from a 100-foot thick sand reservoir. The production rate is limited by the oil's high viscosity at reservoir temperature, therefore, it is common practice to cyclic steam the producing wells to stimulate production. Usually about 16,000 barrels of steam are injected into the wells over a period of about three weeks. They are then put on a production cycle until declining oil production rates necessitate another steam cycle.

The reservoir sand is very susceptible to permeability damage when contacted by relatively fresh water such as steam condensate. Also, the rock is susceptible to dissolution in the near wellbore region by hot alkaline waters such as the usual residual liquid phase of generator effluent. Therefore, the feedwater is treated with enough morpholine hydrochloride to bring the pH of the residual liquid phase of the generator effluent to the desired level. Also, morpholine is added to the feedwater to provide enough morpholinium ions in the vapor condensate region of the formation to prevent permeability damage.

The approximate amount of morpholine hydrochloride necessary to counteract the alkalinity from decomposition of bicarbonate ions in the feedwater is determined by the following. The feedwater bicarbonate concentration is found to be 610 mg/1 which is 0.01 normal. Thus, it takes 0.01 mole of morpholine hydrochloride/1 (0.44 lbs/bb1) to counteract the bicarbonate. The pH monitoring equipment provides the fine adjustments to bring the pH of the residual liquid effluent to the selected value.

The total amount of morpholine and morpholine hydrochloride added to the feedwater to prevent permeability damage in the vapor condensate region of the formation is based on the volume of rock one wishes to protect and the treatment efficiency factor for morpholine which is determined experimentally in the laboratory. In this case, it is determined that the treatment efficiency factor is 4.0 gm morpholine/kg of rock. It is also decided that a volume of rock equivalent to a radius of 10 feet from the well is to be effectively treated with morpholinium ions at the conclusion of the steam injection process. From the calculated volume of rock to be treated, a porosity of 20%, and the determined treatment efficiency factor, it is calculated that 16,600 lbs of morpholine are needed to treat the chosen amount of rock. This is about 1.04 lbs of morpholine/bb1 of feedwater.

Since 0.44 lbs of morpholine hydrochloride/bb1 (equivalent to about 0.31 lbs of morpholine/bb1) are added for pH control of the residual liquid phase, this leaves an additional 0.73 lbs of morpholine/bb1 to be added for permeability damage prevention. The morpholine may be batch-mixed in the feedwater tanks or pumped into the generator feed line. The morpholine hydrochloride, on the other hand, should be fed into the feed line using a chemical pump and a flow controller sensing the pH of the residual liquid phase.

While the present invention has been described with reference to specific embodiments, this application is intended to cover those various changes and substitutions which may be made by those skilled in the art without departing from the spirit and scope of the appended claims.

What is claimed is:

1. A method for controlling pH in the liquid and vapor phases of wet steam having such phases formed in a steam generation system from feedwater having therein at least one carbonate species which in the presence of steam forms a vapor phase component tending to lower the pH of the vapor phase of the steam upon condensation and a liquid phase component tending to raise the pH of the liquid phase of the steam, comprising:
   (a) converting the feedwater in a steam generation system to steam having a vapor phase and a liquid phase; and
   (b) adding to the steam generation system a heterocyclic, multifunctional, nitrogen-containing compound capable of forming a nonvolatile anionic component and a cationic component that, in the presence of said steam, yields hydrogen ions for reducing the pH of the liquid phase of said steam and an alkaline component for increasing the pH of the vapor phase of said steam upon condensation.

2. A method, according to claim 1, wherein said heterocyclic, multifunctional nitrogen-containing compound is selected from the group of acid salts of morpholine.

3. A method, according to claim 2, wherein salt comprises morpholine hydrochloride.

4. A method, according to claim 1, wherein said heterocyclic, multifunctional, nitrogen-containing compound is selected from the group of acid salts of imidazoles.

5. A method, according to claim 4, wherein said salt comprises imidazole hydrochloride.

6. A method, according to claim 1, further comprising:
monitoring the pH of the residual liquid phase of said steam and continually adjusting the addition of said pH altering compound to maintain the pH of said liquid phase within the range from about 8.0 to about 10.0.

7. A method, according to claim 6, wherein the pH ranges from about 8.5 to about 9.5.

8. A method, according to claim 1, further comprising:
adding to the steam generation system a compound which decomposes in said system to form acid neutralizers or buffers having alkaline pH values.

9. A method, according to claim 8, wherein said decomposing compound is selected from the group consisting of amides or carbamic acid and derivatives thereof, amides of tiocarbamic acids and derivatives thereof, ertiary carboxylic acid amides and their substituted and alkylated derivatives and mixtures thereof.

10. A method, according to claim 9, wherein said decomposing compound is urea.

11. A method for controlling pH in the liquid and condensed vapor phases of wet steam having such phases formed in a steam generation system from feedwater having therein at least one carbonate species which, in the presence of steam, forms a vapor phase component tending to lower the pH of the vapor phase of the steam upon condensation and a liquid phase component tending to raise the pH of the liquid phase of the steam, comprising:
(a) converting the feedwater in a steam generation system to steam having a vapor phase and a liquid phase;
(b) adding to the steam generation system, a pH altering compound comprising morpholine hydrochloride which is capable of forming a nonvolatile anionic component and a cationic component that, in the presence of said steam, yields hydrogen ions for reducing the pH of the liquid phase of said steam and alkaline component for increasing the pH of the vapor phase of said steam upon condensation;
(c) adding to the steam generation system a compound comprising urea which decomposes in said system to form acid neutralizers or buffers having alkaline pH valves; and
(d) monitoring the pH of the residual liquid phase of said steam and continually adjusting the addition of said comprising urea to maintain the pH of said liquid phase within the range of about 8.5 to about 9.5.

12. A method for controlling pH in the liquid and condensed vapor phases of wet steam having such phases formed in a steam generation system from feedwater having therein at least one carbonate species which in the presence of steam forms a vapor phase component tending to lower the pH of the vapor phase of the steam upon condensation and a liquid phase component tending to raise the pH of the liquid phase of the steam, comprising:

(a) converting the feedwater in a steam generation system to steam having a vapor phase and a liquid phase;
(b) adding to the steam generation system an acid which forms an acidic component for reducing the pH of the residual liquid phase of said steam; and
(c) adding to the steam generation system, a heterocyclic, multifunctional, nitrogen-containing compound which forms an alkaline component for increasing the pH of the vapor phase of said steam upon condensation.

13. A method, according to claim 12, wherein said alkaline component forming compound is selected from the group of morpholines, substituted morpholines, imidazoles, and substituted imidazoles.

14. A method for inhibiting permeability damage of a hydrocarbon formation containing clay minerals in the vicinity of a well penetrating said formation comprising: injecting a wet steam that includes an amount of a heterocyclic, multifunctional, nitrogen-containing compound in the vapor phase of said wet steam effective to inhibit permeability damage to the formation in the vicinity of said vapor phase.

15. A method, according to claim 14, wherein said heterocyclic, multifunctional, nitrogen-containing compound is selected from the group consisting of morpholines, substituted morpholines, imidazoles, and substituted imidazoles.

16. A method inhibiting permeability damage of a hydrocarbon formation containing clay minerals and for controlling pH in the liquid and condensed vapor phases of wet steam having such phases formed in a steam generation system from feedwater having therein at least one carbonate species which in the presence of steam forms a vapor phase component tending to lower the pH of the vapor phase of the steam upon condensation and a liquid phase component tending to raise the pH of the liquid phase of the steam, comprising:
(a) converting the feedwater in a steam generation system to steam having a vapor phase and a liquid phase;
(b) adding to the steam generation system, a heterocyclic, multifunctional, nitrogen-containing compound capable of forming a nonvolatile anionic component and a cationic component that, in the presence of said steam, yields hydrogen ions for reducing the pH of the liquid phase of said steam and an alkaline component for increasing the pH of the vapor phase of said steam upon condensation;
(c) adding to the vapor phase of said wet steam an amount of a heterocyclic, multifunctional, nitrogen-containing compound effective to inhibit permeability damage of said hydrocarbon formation in the vicinity of said vapor phase; and
(d) injecting the vapor phase into the hydrocarbon formation.

17. A method, according to claim 16, wherein the compound of step (b) is selected from the group consisting of acid salts of morpholine and imidazole.

18. A method, according to claim 17, wherein the compound of step (c) is selected from the group consisting of morpholines, substituted morpholines, imidazoles, and substituted imidazoles.

* * * * *